May 31, 1960  J. T. GONDEK  2,938,400
SCREW THREAD

Filed Feb. 2, 1956  2 Sheets-Sheet 1

INVENTOR
John T. Gondek
BY Robert M. Dunning
ATTORNEY

May 31, 1960 J. T. GONDEK 2,938,400
SCREW THREAD

Filed Feb. 2, 1956 2 Sheets-Sheet 2

INVENTOR
John T. Gondek
BY
ATTORNEY

United States Patent Office 2,938,400
Patented May 31, 1960

2,938,400

SCREW THREAD

John T. Gondek, 2206 Roosevelt Ave. NE.,
Minneapolis, Minn.

Filed Feb. 2, 1956, Ser. No. 562,984

3 Claims. (Cl. 74—424.8)

This invention relates to an improvement in screw thread construction and it is desired to provide a novel and effective screw thread arrangement.

Numerous types of screw threads arrangements have been produced, certain of which are designed to increase the power which can be produced from the rotation of a threaded member. In certain of these constructions ball bearings or similar bearing balls have been provided which travel within an inclined tract in a suitable internally threaded member. Upon rotation of one threaded member with respect to the other, the balls travel in a helical path and then are conducted by a suitable passageway from one end of the thread to the other. The present invention resides in the provision of a screw thread construction which has some similarity to that previously employed but which does not have the accompanying disadvantages.

The prior art has embraced the provision of a male and female member, one of which is threaded, the male member being rotatable within the female member. A series of balls or rollers are provided between the threaded member to permit relative rotation therebetween. The female member is preferably provided with a series of circular grooves therein in which the balls or rollers travel. A cage is provided between the two threaded members, the cage acting to hold the balls or rollers in proper angularly spaced relation. As the female rotates with respect to the male member, the balls rotate about the circular grooves and as a result one rotation of the threaded member does not act to move this member the distance between threads. Thus, a great mechanical advantage may be obtained from this conventional design.

It is a well known fact that if one threaded member enters another, one rotation of one member will move the member axially of the other a distance equal to the distance between threads if the two members are single threaded. However, in the present arrangement, rotation of one threaded member permits rotation of the balls within the other member and as a result this member does not move the distance between threads during a revolution thereof.

One advantage of the envisaged general construction resides in the many uses to which the structure may be put. Such a structure is particularly useful where considerable power is required or where a minimum longitudinal movement is desirable for each rotation of the threaded member. Furthermore, a different result can be obtained by rotating different members. For example, it is possible to obtain one result by rotating the internally threaded member and obtaining a different but somewhat similar result by turning the external member. However, by turning the cage which holds the balls in proper angular relation, a third result may be obtained.

A further feature of the type of bearing construction with which the present invention is generally concerned lies in the fact that a higher speed operation may be obtained than in ball bearing screw structures where the ball bearings travel in a spiral path and then through a return passage to the starting end of the screw, and speed of rotation is limited.

An object of the present invention is to employ one rotatable member formed with circular grooves, a second rotatable member formed with spiral grooves, and a plurality of rollable bearing members received in said grooves, said bearing members having at least two diameters, whereby a larger number of said bearing members may be utilized.

The above and other objects and novel features of the invention will be more clearly and fully set forth in the following specification and claims.

In the drawings forming a part of the specification:

Figure 1:
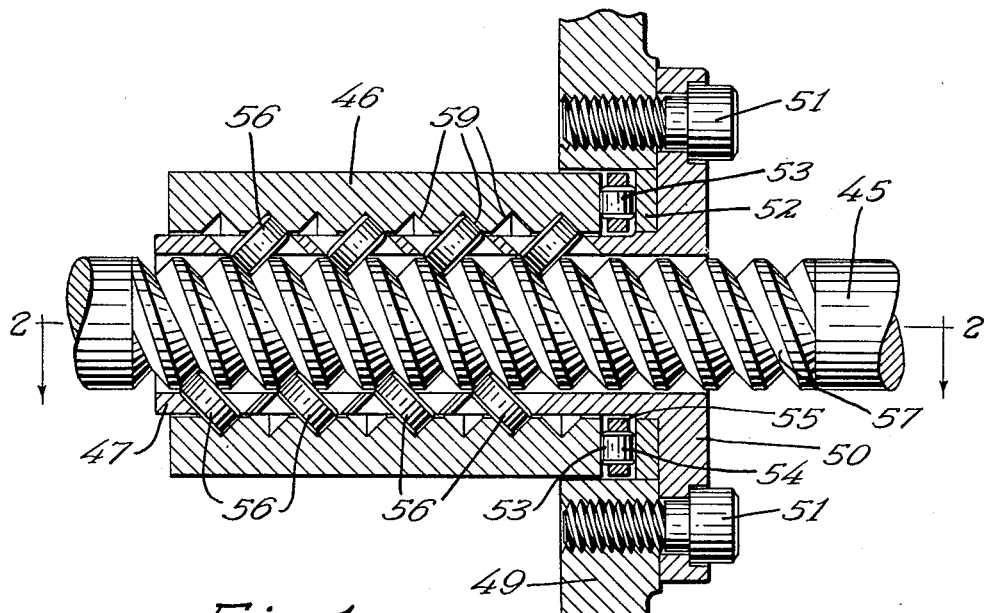
Figure 1 is a sectional view through one form of construction in which rollers are employed.

In Figure 1 of the drawings I disclose a form of construction in which rollers are employed between the male and female portions of the apparatus to provide the necessary bearing between the screw thread and the internally threaded member. In this arrangement a screw thread 45 is rotatable within a sleeve 46. The sleeve 46 is rotatable with respect to the screw thread 45 and in the embodiment illustrated both the sleeve 46 and the screw thread 45 are rotatable relative to a cage 47 which is positioned between the screw thread 45 and the sleeve.

A fixed support 49 is illustrated encircling the sleeve 46 and a flange 50 upon the cage 47 is secured to the fixed member 49 by cap screws 51 or the like. A thrust washer is provided adjoining the flange 50 and a thrust bearing 53 comprising radially extending rollers or balls 54 supported in the ring shaped cage 55 is positioned between the thrustwasher 52 and the end of the sleeve 46.

Rollers 56 are mounted in the sleeve cage 47. These rollers 56 are engageable in the external threads 57 of the threaded member 45 and are engageable in circular grooves 59 in the interior of the sleeve 46. As a result the rollers 56 may travel in circular paths within the sleeve 46 and do not move longitudinally thereof. However, rotation of the sleeve 46 will cause endwise movement of the threaded member 45. When the cage is held stationary, the actual lead of the screw will be obtained.

While the structure of Figure 1 is shown embodying rollers in place of the ball bearings, the operation is in general similar. The rollers have a greater bearing upon the screw threads and upon the grooves of the rotatable member than do ball bearings and accordingly the use of rollers is of advantage. However, it should be understood that in Figure 1 the cage supporting the bearings is fixed and for the purpose of illustration it will be understood that a similar arrangement could be provided using ball bearings in place of the rollers.

Figure 2:
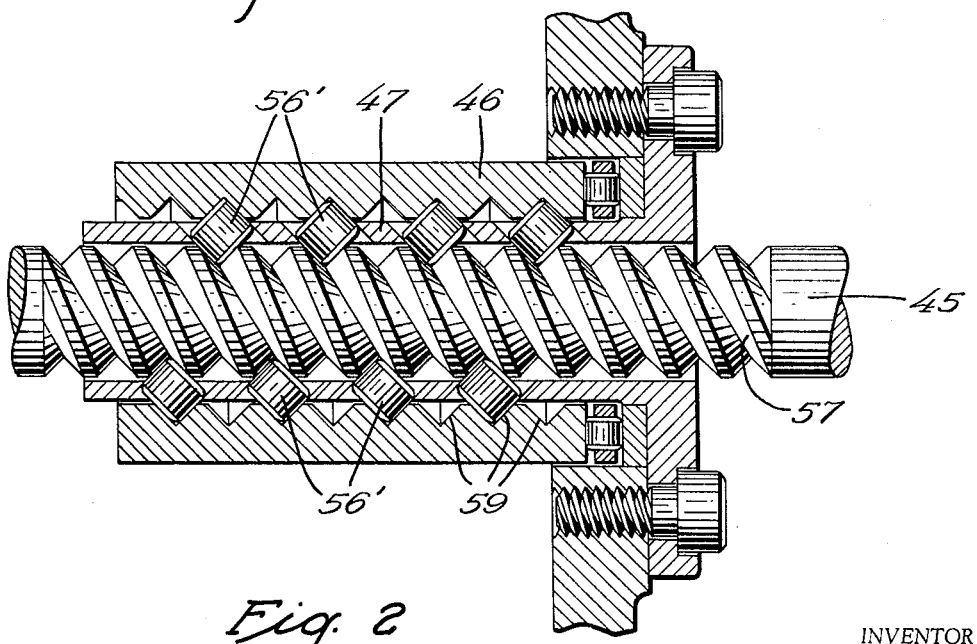
Figure 2 is a section through the construction shown in Figure 1, the position of the section being indicated by the line 2—2 of Figure 1.

Figure 2 illustrates the fact that additional bearing rollers can be provided between the threaded member 45 and the sleeve 46 by making the rollers of different diameter. As the grooves 59 are circular, and the thread 57 is spiral, only one roller of a certain diameter may be used between each groove and the thread. However, by employing rollers of different diameters at proper angular relations, more rollers may be provided in each groove. Figure 2 shows a second set of rollers 56' of smaller diameters than the rollers 56 held by the cage 47 in angular relation to the rollers 56.

Figure 3:
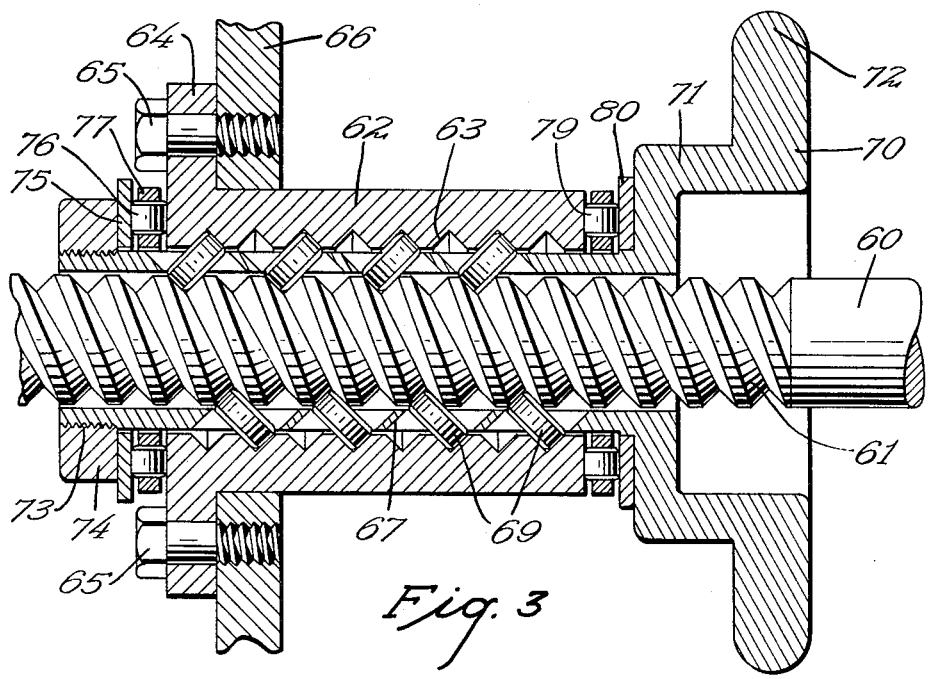
Figure 3 is a sectional view similar to Figure 1 but showing a slightly different arrangement of the part therein.

Figure 3 of the drawings shows another arrangement which differs in some respects to the constructions shown in previous drawings. The device of Figure 2 embodies a rotatable threaded member 60 having external threads 61. A sleeve 62 encircles the threaded member 60 and is provided with circular grooves 63 extending thereabout in its inner surface. The sleeve 62 is provided with a peripheral flange 64 which is anchored by cap screws 65 or other suitable means to a fixed member 66.

A cage 67 is positioned between the sleeve 62 and the threaded member 60 and is designed to accommodate bearing rollers 69 which are interposed between the grooves 63 and the threads 61. As in the construction shown in Figure 1 the bearing rollers 69 are angled or are arranged with their axes at an acute angle to the axis of the threaded member 60 so as to transmit strain from the sleeve 62 to the threaded member 60 are vice-versa. The cage 67 is provided at one end with a fly 70 connected by a cylindrical sleeve portion 71 to a rotating member 72 which may be in the form of a gear, pulley, handwheel or any other suitable drive or driven member which may be connected to a suitable power source or driven member.

The other end of the cage 67 is threaded as indicated at 73 to accommodate a nut 74. A bearing washer 75 is interposed between the nut 74 and a bearing roller 76 mounted in a ring shaped cage 77. A second thrust bearing 79 is interposed between the opposite end of the sleeve 62 and a bearing washer 80 so as to resist thrust in the opposite direction. In other words the bearings 76 and 79 hold the sleeve 62 from axial movement relative to the cage 67.

Rotation of the member 72 will rotate the cage 67 and will therefore act upon the threaded member to cause the same to move axially in either direction. Similarly, movement of the threaded member 60 will act through the rollers 69 to rotate the member 72 in either direction.

Unless the cage is held stationary, the lead of the screw is advanced as rotation takes place.

Figure 4:
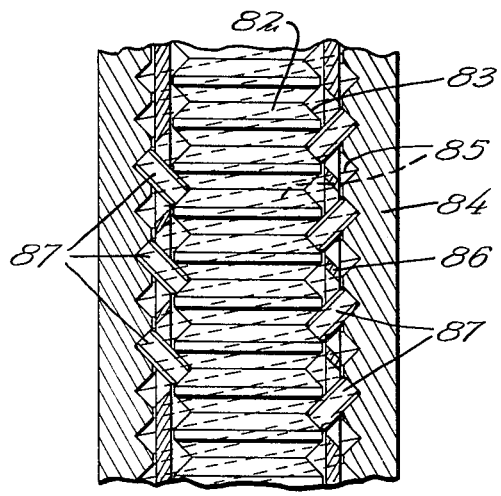
Figure 4 illustrates in section a modified form of construction.

In Figure 4 I disclose a modified form of construction which is somewhat the reverse of the construction previously described. In this form of construction a rod-like member 82 is externally grooved with circular grooves 83. An internally threaded sleeve 84 is provided with an internal spiral thread 85. A cage 86 is provided between the members 82 and 84, and supports rollers 87 in proper angularly spaced relation.

This structure operates in a manner similar to the structures previously described. The sleeve must be sufficiently long to extend well past the circularly shaped grooves of the member 82, to prevent the sleeve from uncovering the rollers as it moves along the member 82. Alternatively, the rollers could be held to the cage so as to remain in place when exposed.

It will be seen that this arrangement, like that of Figure 1, could be constructed to employ ball bearings in place of the rollers described. The rollers have the advantages previously named, but a structure similar to that of Figure 2 could be made in which the outer sleeve is fixed and the bearing cage and the threaded member may rotate.

In accordance with the patent statutes, I have described the principles of construction and operation of my screw thread construction, and while I have endeavored to set forth the best embodiment thereof, I desire to have it understood that obvious changes may be made within the scope of the following claims without departing from the spirit of my invention.

I claim:

1. A screw thread arrangement including an externally V-shaped grooved element, an internally V-shaped grooved element, and a cage between said elements, one of said elements having circular grooves, the other of said elements having spiral grooves, and rotatable antifriction cylindrical bearings fitting between said elements and rotatable in said grooves, said cage holding said bearings in proper spaced relation so that each cylindrical bearing will have its opposite peripheral edges in engagement with the grooves of said elements, the bearings being of at least two different diameters.

2. A screw thread arrangement including an externally V-shaped grooved element, an internally V-shaped grooved element, and a cage between said elements, one of said elements having circular grooves, the other of said elements having spiral grooves, and rotatable antifriction cylindrical bearings fitting between said elements and rotatable in said grooves, said cage holding said bearings in proper spaced relation so that each cylindrical bearing will have its opposite peripheral edges in engagement with the grooves of said elements, certain of said bearings being rotatable in the same circular groove and being angularly spaced, these bearings being of different diameters.

3. A screw thread construction including an externally threaded element, a cooperable element through which said screw threaded element extends, circular grooves in said cooperable element, rollable bearing members interposed between said elements, said bearing members being of at least two different diameters, and means interposed between said elements holding the same in properly spaced relation, whereby rotation of one of said elements relative to the other will cause rotation of said bearing members in said grooves and will also cause longitudinal movement of one element relative to the other.

References Cited in the file of this patent

UNITED STATES PATENTS

| | | |
|---|---|---|
| 2,069,471 | Baker | Feb. 2, 1937 |
| 2,214,493 | Trbojevich | Sept. 10, 1940 |
| 2,266,923 | Trbojevich | Dec. 23, 1941 |
| 2,446,393 | Russell | Aug. 3, 1948 |
| 2,683,379 | Strandgren | July 13, 1954 |
| 2,718,165 | Bourassa | Sept. 20, 1955 |
| 2,739,491 | Russell | Mar. 27, 1956 |
| 2,768,532 | Russell | Oct. 30, 1956 |